United States Patent Office 3,534,130
Patented Oct. 13, 1970

3,534,130
METHOD OF SURFACE TREATING SHAPED ARTICLES OF THERMOPLASTIC SYNTHETIC RESINS
Sadao Yamamoto, Kyoto, Minoru Okubo and Seiichiro Honda, Ibaraki-shi, and Kanzi Oguma, Osaka-fu, Japan, assignors to Sekisui Kagaku Kogyo Kabushiki Kaisha, Osaka, Japan, a corporation of Japan
No Drawing. Filed Feb. 9, 1967, Ser. No. 614,789
Claims priority, application Japan, Feb. 11, 1966, 41/8,248; Mar. 1, 1966, 41/12,966; Mar. 8, 1966, 41/14,470
Int. Cl. B29d 7/22
U.S. Cl. 264—54   9 Claims

ABSTRACT OF THE DISCLOSURE

A method of uniformly roughening the surface of a shaped article of thermoplastic synthetic resin which comprises impregnating the surface layer of said shaped article with a thermally decomposable foaming agent in liquid form, followed by decomposing said impregnated foaming agent by heating it to evolve a gas which erupts and escapes from the surface of the shaped article, thereby imparting a uniformly roughened surface and an excellent printability to said shaped article, and improved the adhesiveness of the surface of said shaped article.

---

This invention relates to a method of uniformly roughening the surface of shaped articles of thermoplastic synthetic resins, for enhancing their graphic and adhesive properties.

The thermoplastic synthetic resins are formed into a wide variety of shapes by means of extrusion and injection molding, etc., and are used for numerous purposes. The surface of these articles made of thermoplastic synthetic resins are, however, smooth and lustrous.

While this property of smoothness and lustrousness makes the shapel articles of the thermoplastic synthetic resins superior to those of other materials in one aspect, on the other hand, it becomes a drawback in that writing or drawing with pencil or the like cannot be done; that even though printing is accomplished using printing ink, it tends to become effected; that the surface tends to be slippery; and that it is difficult to adhere liquid substances to the surface of these articles.

A number of methods have been known for eliminating the smoothness of the surface of the shaped articles of thermoplastic synthetic resins, i.e., methods of roughening the surface of these articles. For example, there is a method of roughening the surface by rubbing the surface with a file or the like, a method of drilling holes by means of a corona discharge, a method of embedding a filler in the surface, a method of dissolving the surface with a solvent and thereafter removing the solvent by heating, thereby setting up cracks in the surface, a methol of spraying the surface with a solvent to elute the resin and form minute pits in the surface, or a method of treating the surface with chemicals which decompose the resin, etc.

However, all of these methods which have hitherto been known had shortcomings in one respect or the other, such as that the time required for treatment was long, roughening of the surface could not be accomplished uniformly and finely, a decrease in tenacity occurred in the case of synthetic resin films, etc.

An object of this invention is to provide a method of roughening the surface of shaped articles of thermoplastic synthetic resin uniformly and finely. Another object resides in roughening the surface of shaped articles of thermoplastic synthetic resin, thereby making it possible to write thereon with a pencil or pen, or to accomplish the printing thereof. A further object is to provide a thermoplastic synthetic resin film having excellent printability as well as a surface similar to paper on which it is possible to write with a pencil, pen and the like.

An additional object of this invention resides in improving the adhesiveness of the surface of shaped articles of thermoplastic synthetic resins.

Other objects and advantages of this invention will become apparent from the followed detailed description.

The foregoing objects are achieved by a method of uniformly roughening the surface of a shaped article of thermoplastic synthetic resin which comprises impregnating the surface layer of the shaped article with a thermally decomposable foaming agent in liquid form, followed by decomposing the impregnated foaming agent by heating it to evolve a gas which erupts and escapes from the surface of the shaped article, thereby imparting a uniformly roughened surface to the shaped article.

As the thermoplastic synthetic resins which form shaped articles according to the invention method, included are the homopolymers such as polyethylene, polypropylene, polyvinyl chloride, polyvinylidene chloride, polystyrene, polyacrylonitrile, polyacrlic acid esters, polymethacrylic acid esters, polyvinyl acetals and polyamides, the copolmers such as styrene-acrylonitrile copolymer, styrene-butadiene copolymer, vinyl chloride-ethylene copolymer, ethylene-vinyl acetate copolymer and styrene-methyl methacrylate copolymer, and the mixtures of the foregoing polymers. As required, resins containing stabilizers, such inorganic fillers as talc, calcium carbonate, zinc sulfide and clay or organic fillers as monofils are used. On the other hand, the shaped articles of these thermoplastic resins include those which have been formed by these resins alone or those which have been formed of a swelled member which are formed by the incorporation of a foaming agent in these resins, and include films, stretched films, sheets, stretched sheets, plates or containers and the like, which are formed by such methods as extrusion, rolling, injection and vacuum molding methods.

The thermally decomposable foaming agents, as used in this invention, are those which decompose by heat to evolve a gas. As these foaming agents, included are, e.g., dinitrosopentamethylene tetramine, azobisisobutyronitrile, paratoluene sulfoazide, diethylazodicarboxylates, benzene sulfoazide, N,N'-dimethyl-N,N'-dinitrosoterephthalamide, paratoluene sulfonylhydrazide, diphenyl sulfone, P,P'-dihydroxybisazodicarbamic acid amide, trihydrazinetriamine, azoidicarbonamide, diazoaminobenzene, P,P'-oxybisbenzene sulfonylhydrazide and the derivatives as well as mixtures of the foregoing compounds. As it is necessary that these thermally decomposable foaming agents permeate the surface of the thermoplastic synthetic resin shaped particles uniformly, they are used as a liquid. Those which are liquid at room temperature, such as paratoluene sulfoazide, diethylcarboxylate and benzene sulfoazide, can be used as such, but those which are normally solid must be rendered into liquid form before use. As a procedure of rendering these solid foaming agents into liquid form, they can be melted by heating them at a temperature ranging above the melting point but below the decomposition temperature in the case of the aforesaid foaming agents whose melting point is below their decomposition temperature. Alternatively, there is a method of dissolving these foaming agents in a solvent thereof. The solvents to be used in the latter method differ depending upon the class of the foaming agents, as illustrated in Table I, below.

TABLE I.—SOLVENT OF THERMALLY DECOMPOSABLE FOAMING AGENTS

| Foaming agent | Solvent |
|---|---|
| Azobisisobutyronitrile | Methanol, ethanol, ketones, ethers. |
| Azodicarbonamide | Hot water, dimethylformamide. |
| Diazoaminobenzene | Methanol, ethanol, benzene, chloroform, ethers. |
| Benzene sulfonylhydrazide | Ethanol, ethylene glycol. |
| Paratoluene sulfonylhydrazide | Methanol, ethanol, methyl ethyl ketone, ethylene dichloride, xylene. |
| Paratoluene sulfoazide | Methanol, methyl ethyl ketone, acetone. |
| Benzene sulfoazide | Alcohols, ketones, benzene. |
| Diethylazodicarboxylate | Alcohols, ketones. |

According to this invention, the thermally decomposable foaming agent which has been rendered into liquid form must have the ability to permeate the surface of the thermoplastic synthetic resin shaped article. There are some among the thermally decomposable foaming agents in which the foaming agent has per se the ability of either dissolving or swelling the surface of the thermoplastic synthetic resin shaped articles. These can be used as such, but when a foaming agent which cannot permeate the surface of these articles is used, it becomes necessary to make it possible for the foaming agent to permeate the surface of the shaped articles. This is done by adding to the liquified thermally decomposable foaming agent a solvent which is capable of dissolving or swelling the thermoplastic synthetic resin of which the shaped article is made. As this solvent, one is used suitably chosen in accordance with the class of the thermoplastic synthetic resin which forms the shaped article, as illustrated in Table II, below.

TABLE II.—SUITABLE SOLVENTS FOR THE VARIOUS RESINS

| Resin | Solvent |
|---|---|
| Vinyl chloride resins | Tetrahydrofuran, acetone, dimethyl formamide, cyclohexane. |
| Styrene resins | Methyl ethyl ketone, benzene, toluene, dimethylformamide, dioxane, acetone, trichloroethylene, butyl acetate. |
| Polymethyl methacrylate | Methyl ethyl ketone, formic acid, acetone, chloroform, benzene, ethylene dichloride. |
| Polyethylene | Xylene, toluene, formic acid. |
| Polypropylene | Toluene, decane. |
| Polycarbonates | Methylene chloride, m-cresol. |
| Polyesters | Phenol-tetrachloroethane mixture. |
| Polyamides | Carbolic acid, cresol, formic aicd, hot acetic acid, alcohols. |

While the foregoing solvents of the resins are in nearly all cases suitably usable also as solvents of the foaming agents, even those which are not solvents of the foaming agents can also be used provided they are compatible with the foaming agents and the solvents of the foaming agents.

The so obtained foaming agent solution has the ability to permeate the surface of shaped articles of thermoplastic synthetic resins. However, when the foaming agent solution with rapid permeability permeates the surface of the shaped articles too deeply, the permeability must be adjusted suitably. This is accomplished by mixing as a permeation inhibitor in the solution of the thermally decomposable foaming agent a nonsolvent of the resin of which the shaped articles is formed. In practically all cases, this permeation inhibitor is a solvent of the foaming agent but a nonsolvent of the resin. However, the permeation inhibitor may be a nonsolvent of the foaming agent. In this case, the foaming agent which has been dissolved in advance in a solvent is mixed in a nonsolvent containing an emulsifying agent to yield an emulsion, in which form it is used. Further, the permeation inhibitor also serves as a diluent to reduce the concentration of the foaming agent.

Thus, as hereinabove described, the resin forming the shaped article and the solvent of the foaming agent which is to be chosen in accordance with the thermally decomposable foaming agent that it is to be used, the solvent of the resin and the permeation inhibitor must be mutually compatible. Further, these solvent mixtures must not be such that they precipitate the foaming agent. In Table III, below, are shown suitable combinations of the thermally decomposable foaming agents and the various solvents which are appropriate for the various thermoplastic resins. The solvents of the resin and the permeation inhibitors given in the table are all also solvent of the foaming agent.

TABLE III.—FOAMING AGENTS AND SOLVENTS APPROPRIATE FOR THE VARIOUS RESINS

| Resin | Foaming agent | Solvent of resin | Permeation inhibitor |
|---|---|---|---|
| Styrene resins | Paratoluene sulfoazide | Not required | Methanol. |
| | Benzene sulfoazide | do | Do. |
| | Azobisisobutyronitrile | Methyl ethyl ketone, acetone | Do. |
| Vinyl chloride resins | Paratoluene sulfonylhydrazide | Tetrahydrofuran, acetone | Do. |
| | Diethylazodicarboxylate | do | Do. |
| | Azodicarbonamide | Dimethylformamide | Hot water. |
| Polymethyl methacrylate | Paratoluene sulfoazide | Acetone | Methanol. |
| Polyethylene | do | Xylene | Do. |
| Do | Dinitrosopentamethylene tetramine | Toluene | Do. |
| Polycarbonates | Paratoluene sulfonylhydrazide | Ethylene dichloride | Methanol, acetone. |
| Amide resins | Paratoluene sulfoazide | Methanol, formic acid | Not required. |
| Acetal resins | Benzene sulfoazide | Hot m-cresol | Methanol. |

Since the foaming agent solution consisting of the thermally decomposable foaming agents and the various solvents must contact and permeate the surface of the thermoplastic resin shaped article uniformly and readily, its viscosity is preferably not more than 10 poises. On the other hand, when the viscosity is too low, there are instances in which the surface of the shaped article repels the foaming agent solution locally to make impossible a uniform contact. In this case, the viscosity may be raised slightly by the addition of a viscosity increasing agent.

Further, the inorganic fillers such as talc, calcium carbonate, zinc sulfide, titanium dioxide, zinc oxide, barium sulfate, magnesium oxide, magnesium carbonate, clay, etc., or the organic fillers such as microcrystalline cellulose, monofilaments, etc., can be mixed in the foaming agent solutions consisting of the foaming agents and the various solvents. These fillers adhere to the surface of the shaped articles and are convenient in assisting the roughening of the surface of the shaped article. Further, it is also possible to incorporate antistatic agents, dyestuffs, ultraviolet absorbents, antioxidants and stabilizers in the mixture of the foaming agents and the various solvents. This also serves to improve the surface of the shaped articles.

As a method of contacting the surface of shaped articles of thermoplastic synthetic resins with the foaming agent solution prepared from the thermally decomposable foaming agent and the various solvents, such as hereinbefore indicated, there is a method of dipping the shaped articles in the foaming agent solution. Another consists of either painting or spraying the surface of the shaped articles with the foaming agent solution or flowing and spreading the solution over the surface.

The surface layer of the shaped article, which has been contacted with the foaming agent solution consisting of the foaming agent and the various solvents, is believed to become one of the following three forms: (a) the resin of the surface of the shaped article having been dissolved by the foaming agent solution, a fluid layer is formed; (b) a swelled layer is formed in which the superficial layer has been swelled in rubberlike fashion as a result of the impregnation of the resin with the foaming agent solution; and (c) a solid swelled layer is formed wherein, though the resin has been impregnated with the foaming agent solution, the surface layer maintains its solid state and is not readily deformed. In the case where the surface is in a state of a fluid layer as in (a), when the foaming agent decomposes and evolves a gas, numerous pits are formed temporarily but owing to the flow of the resin the surface immediately assumes a fluent uneven state, and hence the objects of this invention are not achieved. In the case where the surface is in a state of a swelled layer as in (b), the resistance of the resin being suitable, the traces remaining after the gas has escaped become craterlike depressions, thus accomplishing the roughening as intended by this invention. On the other hand, in the case of the solid swelled layer of (c), since the resistance of the resin is too great when the gas evolves, the gas, not being able to escape, remains in the resin as bubbles and, as a result, the surface is not roughened. Hence, it is to be preferred that in this invention the composition of the foaming agent solution and the amount impregnated thereof is so adjusted that the surface of the shaped article is in the state of a swelled layer, as in (b).

The roughening of the surface of the shaped article which has been impregnated with the foaming agent as hereinabove described, is then accomplished by causing the decomposition of the foaming agent to evolve a gas which as it escapes forms numerous minute pits, thereby providing the shaped article with a surface which is suitable roughened.

The methods of decomposing the thermally decomposable foaming agent with which the shaped article is impregnated include a method of heating the shaped article to a temperature at which the foaming agent decomposes or a method in which heat treatment is carried out while using as assistants chemicals which have the action of decomposing the foaming agent, such as acids or alkalis. As heating means to be used in the method of decomposing by heating, usable are hot air, steam, hot water, infrared rays and high frequency waves. On the other hand, when the decomposition of the foaming agent which has been impregnated is difficult or when it is desired to decomposes the foaming agent hastily or when it is not desirable to carry out the treatment at elevated temperatures, the heating method of decomposition in which a chemical is conjointly used, such as mixing in a chemical as acids or alkalis in hot water, is preferably used.

According to this invention, since heating is carried out in decomposing the foaming agent, the surface of the resin is softened, with the consequence that the solid swelled state of (c), as hereinbefore described, is converted to the suitable swelled layer of (b), thus aiding the escape of the evolved gas.

At the time the foaming agent decomposes in this invention, it is preferred that evaporation of the various solvents and diluents, which are incorporated in the foaming agent, take place concurrently with the decomposition of the foaming agent. Hence, in preparing the hereinbefore described foaming agent solution, it is preferred that a combination be chosen in which the decomposition temperature of the foaming agent and the volatilizing temperature of the solvent coincide.

Excluding the unusual cases, the method of decomposition by means of heating which is best used is the one wherein a heated non-solvent of the resin, such as hot water, is used as the heating medium. The reason is because the heating can be performed readily and effectively with uniformity and also because it is easy to control the heating period. According to this method, the most convenient procedure is to dip the foaming agent-impregnated shaped article in the heating medium, but also such other procedures as spraying or painting on the heating medium to the surface of the shaped article or a method of flowing and spreading the heating medium over the surface may also be employed. It is provided however that compatability must exist between the various solvents and diluents, which are present in the foaming agent solution, and hot water, the heating medium. Further, in this method which used a heated medium, such as hereinabove described, in decomposing the foaming agent which has permeated the shaped article, even though the surface of the foaming agent-impregnated shaped article is in a state of a fluid layer as noted in (a), above, its surface is converted to that of a swelled layer, as in (b), above, as a consequence of the decomposition of the foaming agent and evolution of a gas and a concurrent elution into the heated medium, such as hot water, of the solvent of the resin. Hence, there is the advantage that craterlike pits can be obtained in the surface of the shaped article. Again, if a surfactant is incorporated in the nonsolvent of the resin, which is the heating medium, compatability between the latter and the various solvents in the foaming agent solution which has permeated the shaped article is promoted, and furthermore it also serves to prevent to electrification of the shaped article.

Satisfactory roughening of the surface, however, cannot be obtained when the invention method is used with the shaped articles made of the flexible synthetic resins such as polyethylene, polypropylene and soft polyvinyl chloride, since the minute pits which are formed in the surface do not become craterlike. For solving this point, there is a method of incorporating a crosslinking agent or a thermosetting resin in the foregoing flexible synthetic resin; or a method of incorporating a crosslinking agent in the foaming agent solution thereby hardening the surface of the shaped article concurrently as the foaming agent decomposes and forms the pits. This latter method is conveniently carried out by irradiation by means of radiant and ultraviolet rays. Again, of the thermally decomposable foaming agents, there are some, such as paratoluene sulfoazide, which have crosslinking properties. It is, of course, best to use a foaming agent such as this.

These surface conditions of the shaped articles which have been surface treated by the invention method will differ considerably depending upon the various factors. Hence, the various conditions must be decided in consideration of what use is intended for the surface-treated shaped article. However, the object of this invention resides in forming in the surface of the shaped articles minute pits of suitable depth uniformly and in great numbers, the pits being of such structure that they are craterlike.

Of these objects, the adjustment of the depth of the pits is important. If too shallow, the effects of the surface treatment according to this invention are not manifested, whereas if too deep, it is undesirable as the physical strength of the shaped articles (particularly films) declines. For this purpose, either the amount of the solvent of the resin in the foaming agent solution or the amount of the foaming agent that can permeate the resin is adjusted by means of a nonsolvent of the resin, i.e., a permeation inhibitor, whereby a suitable rate of permeation is attained. Or this is accomplished by decomposing the foaming agent and removing the various solvents at the instant the foaming agent solution reaches the intended depth. Further, the rate of permeation also varies according to the temperature at which the mixed solution containing the foaming agent and the surface of the shaped article make contact and hence affects the depth of the pits. That is to say, if the temperature of contact is high permeation is rapid as well as deep. For raising this contact temperature, either the foaming agent solution may be heated to a temperature not exceeding the limit beyond which decomposition of the foaming agent takes place or the shaped article may likewise be heated to a temperature not exceeding that at which deformation of the article takes place. Either will do, or they may be carried out conjointly.

On the other hand, the number of minute pits is influenced by the quantity of the foaming agent solution which contacts the surface of the shaped article, the concentration of the foaming agent in the foaming agent solution and the amount of gas evolved by the foaming agent. Of these factors, the amount of gas evolved varies depending upon the class of foaming agent. When the amount of gas evolved is great, not only is there the advantage that the number of pits becomes greater, which is desirable, but also pits are formed with certainty and moreover the amount required of the foaming agent is less.

As regards the configuration of the pits, this will vary depending upon the rate at which the gas is evolved by the decomposition of the foaming agent. Since the pit configuration as intended by this invention is of craterlike form, it is desirable that the foaming agent used be one which evolves a gas rapidly and that this foaming agent be decomposed rapidly.

The invention method is generally applied to shaped articles which, after having been previously formed from the thermoplastic synthetic resins, have been cooled to room temperature, but it also be used particularly when forming the shaped articles.

In the latter method, immediately after the formation of the shaped article into any one of a variety of configurations, and while the resin forming the shaped article is still in its soft state, the hereinbefore described foaming agent solution is contacted with the surface of the shaped article. Since the resin forming the shaped article is in a soft state, the foaming agent solution immediately permeates to the interior of the resin and at the same time the foaming agent immediately decomposes to evolve a gas and form in the the surface of the shaped article pits, thereby imparting a roughened surface to the shaped article.

When the temperature of the shaped article is considerably higher than the decomposition temperature of the foaming agent in this method, the foaming agent, upon being contacted with the surface of the shaped article, decomposes before it permeates to the interior of the resin. Hence, it is required that this method be carried out at a point where the shaped article has been cooled to a proper temperature. Further, the composition of the foaming agent solution must be so mixed that the permeability is somewhat weakened in view of the fact that the resin making up the shaped article is in a state of activation due to the elevated temperature. Thus, although this method requires the exercise of a certain amount of caution, it is one of the methods which can be highly recommended, because the roughening of the surface of shaped articles can be achieved very efficiently in an exceedingly short period of time.

According to this method, the point referred to as "immediately after the formation of the shaped article and while the resin forming the shaped article is in a soft state" is meant to be as follows: For example, in the extrusion molding method, the state immediately after extrusion from the extrusion die; in the inflation molding method, the state immediately after extrusion from the circular die and while the shaped article is being drawn; in the roll molding method, the state immediately after rolling by the final rolls; in the blow molding method, the state of the resin after being extruded from the parison die and before it enters the split mold and the state immediately after having been formed in the split mold to a shaped article; and in the injection molding method, the point at which the resin after passing through the screw has been injected from the nozzle into a mold and molded into a shaped article. Further, in the case of the formation of film and the like according to this invention, if the operation of roughening the surface of the shaped article is carried out conjointly with the operation of drawing the shaped article, the method is carried out effectively and to advantage since the formation of the minute pits is promoted and the craterlike pits are enlarged. For instance, in the case of the roll molding method, the procedure comprises taking up the shaped article at a speed greater than that at which it is being delivered by the rolls. On the other hand, in the case of the inflation molding method, there is either a monoaxial drawing technique wherein the shaped article of film or tabular form is taken up at a faster rate than it is being extruded, while blowing air into the shaped article, or a biaxial drawing technique wherein the shaped article is swelled and distended transversely concurrently as it is being taken up at a rate faster than it is being extruded.

While it is not clear why the minute pits can be obtained well according to this method, it is believed that it is in all likelihood due to the following reason. Namely, simultaneously as the foaming agent solution is brought into contact with the surface of the shaped article, a part of the solvents in the foaming agent solution volatilizes, with the consequence that the temperature of the surface of the shaped article falls temporarily while in the meantime the foaming agent, without decomposing, permeates to interior of the resin from the surface of the shaped article. Then after practically all the solvents have volatilized, temperature of the surface of the shaped article again rises since the temperature inside the shaped article is high, in consequence of which the foaming agent decomposes to evolve a gas and hence impart a satisfactory roughened surface to the shaped article.

This method is particularly effective in the case of those resins which are relatively difficult to impregnate with foaming agent solutions, such as polyethylene, polypropylene, polyesters and polycarbonates.

In view of the fact that the invention method imparts properties to the surface of shaped articles making it possible to write or print characters thereon and thus shaped articles in the form of film finds wide utility as a paper substitute, the invention method relative to the treatment of shaped articles in the form of film will be described below.

When treating films of a thickness less than 0.2 mm. by means of the invention method, if the permeability of the foaming agent solution to the resin is too great, there arises the possibility that either the solution penetrates the two sides of the film to cause it to become holey or causes it to lose its flatness. Thus, extreme care must be exercised in the preparation of the foaming agent solution, ensuring that the permeability is suitably adjusted by the addition of a nonsolvent of the resin. The foaming agent which has permeated the surface layer of the film is then decomposed by an operation such as heating. However since heat shrinkage is set up in the film by heating, particularly in the case of a stretched film and furthermore in case the method of decomposing the foaming agent is by means of heating, it is preferred that the heating is carried out while securing the film fast in such a fashion that its flatness is maintained. Further, if a stretched film is treated, as hereinabove described, in a secured state and by causing the decomposition of the foaming agent by heating to impart a roughness to its surface, annealing effects are provided concomitantly to yield an excellent product. For securing the film fast, a tentering frame, pinch rolls or the like are used. On the other hand, when the invention method is applied to freshly formed film as in the case of that which is still in a soft state immediately after extrusion from an extrusion die of the inflation molding technique, the solvents mixed with the foaming agent volatilize and decompose concurrently as the foaming agent makes its permeation into the film, and hence the pits do not become so deep. However, when the foaming agent and the solvents mixed therewith volatilize, a considerable amount of heat is lost. Since this results in the impairment of the configuration of the film at times, it is necessary to adjust the temperature of the foaming agent solution as well as to make a proper choice as to the time in which to bring the foaming agent solution into contact with the film. If the depth of the pits formed in the film on one side thereof, i.e., the thickness of the layer that is roughened is made to be of the order of one fourth of the film thickness, the strength and configuration of the film are not impaired. However, in the case of a film of a thickness less than 0.05 mm., it is preferred that this roughened layer be less than 0.01 mm.

Next, in view of recent attempts to use as synthetic resin paper the foamed film having independent cells, such as polystyrene film, the treatment of the foamed films according to the invention method will be described. As the formation of foamed film having independent cells is generally accomplished by the extrusion from an extruder of a resin containing a foaming agent, the surface of this film does not have pits but is covered with an outer skin layer. Hence, the foamed film as such, even though used as a paper substitute, cannot be used for printing nor can characters be satisfactorily written on it with pencils or the like. A very good paper substitute can be obtained when the invention method is applied to this foamed film. However, due to the fact that foamed film is made up of minute independent cells, the permeation of the foaming agent solution takes place very easily and hence there is a tendency to the depth of the pits formed becoming deep. Further, since the permeation of a foaming agent solution is predominantly by capillarity, the depth of the pits tend to become nonuniform. Consequently, it is necessary that suitable adjustments be made in such as the composition of the foaming agent solution and the contact between the foaming agent solution and the foamed film. Since pencil or the like stick into polystyrene foamed film when characters are being written on the latter, it is necessary to employ the operation of pressing the polystyrene foamed film in conjunction with this invention. While this pressing is usually performed prior to the treatment according to this invention, in those cases where especial flatness is required in printing the film, it is well to carry out the pressing after the invention treatment. Again, when the invention method is carried out using polystyrene foamed film which has been pressed with rolls, the density of film is increased, with the result that the permeation of the foaming agent solution becomes uniform. The polystyrene foamed sheet obtained in this manner becomes a very excellent paper substitute. Further, even in the case of films which have been crosslinked slightly, such as the polyethylene foamed film, the invention method can be applied if it is one whose surface can be rendered into a swelled layer.

Although the invention method makes possible the provision uniformly on the surface of thermoplastic synthetic resin shaped articles, of minute pits by a procedure consisting of impregnating the surface of the shaped article with a thermally decomposable foaming agent followed by decomposing the foaming agent and evolution of a gas, according to this invention, the surface of the shaped article can be first surface treated by customary procedures and thereafter be treated by the invention method. For instance, the invention treatment is carried out on the surface of a shaped article which has either been abraded with a file or the like, pitted by means of a corona discharge, or dissolved with a solvent followed by heating to cause cracks to appear therein.

As numerous minute pits (diameters: about 1–10 microns) are formed in the surface of the shaped articles treated by this invention, it becomes possible either to write characters and draw pictures thereon with pencils or the like, or impart printing thereto. Again, since numerous minute pits are formed, the slipperiness of the surface of the shaped article is reduced to render the article suitable for adhering. In addition, it becomes wettable with liquid matter. Further, the surface area of the shaped article is increased considerably as a result of the formation of numerous pits. Furthermore, whereas the cracks and uneveness in the surface treatment heretofore known are large and nonuniform, with the consequence that the properties of the shaped articles decline considerably, the pits of this invention have achieved the objectives of this invention in that they are minute in size, practically independent of each other and have a substantially shallow depth. Hence, there is hardly any decline in the properties of the shaped article.

Thus, as hereinbefore described, the surface of shaped articles treated according to the invention method is imparted a great number of desirable properties. Hence, the so surface-treated shaped articles can be applied to a wide variety of new uses. Namely, when the shaped article is film, it becomes a synthetic resin paper substitute and can be used as tracing paper, writing paper, wrapping paper, etc., and it excels the conventional paper in strength as well as resistance to moisture. Again, since the vapor-permeability of the film treated by the invention method becomes good, it is superior as protective film for fruits as well as for other agricultural use. The film obtained according to this invention can be laminated with other film and may be used for a great number of purposes as laminated film. The lamination is readily carried out by vapor deposition and rolling.

Further, the shaped article obtained by this invention is excellent as a base of adhesive tape, since adhesives are readily applied thereto. If film whose both surfaces have been treated by the invention method is used as the base of adhesive tapes, one surface is readily applied with an adhesive while the other surface can be used for writing characters thereon or be impressed with print.

Further, the shaped articles treated with the invention method demonstrate an increase in their surface area and since they are also wettable by means of liquids, they are also used satisfactorily as cooling tower material, heat exchange plates and ion exchange membranes.

In addition, if the invention method is carried out on sheets composed of continuous cells, such as are used for synthetic and imitation leathers or the like, luster can be eliminated from these materials to provide excellent sheets which are capable of being printed.

The following examples are given for illustrating the invention further. The mixture ratios used in these examples are all on a weight basis.

EXAMPLE 1

A 20° C. foaming agent solution containing paratoluene sulfoazide, tetrahydrofuran and methanol in a ratio of 2:3:5 was coated to the surface of a 20-mm. thick polyvinyl chloride sheet. Thirty seconds after application of the solution, the polyvinyl chloride sheet was allowed to stand for 30 seconds in a constant temperature air tank of 120° C. The polyvinyl chloride sheet became semitransparent and its surface became such that ink could be fixed uniformly thereon and writing with pencil or the like was possible.

EXAMPLE 2

A foaming agent solution consisting of paratoluene sulfoazide, xylene and dicumyl peroxide in a ratio of 2:7:1 was heated to 100° C., following which a polyethylene vessel was dipped therein for one minute. This was followed by placing the vessel immediately in a constant temperature air tank of 140° C. where it was allowed to stand for 2 minutes. The surface of the polyethylene vessel from which luster had disappeared was in a hardened state and the adhesion thereto of ink and paint was satisfactory.

EXAMPLE 3

A stretched polystyrene film 0.01 mm. thick was dipped for 3 seconds in a foaming agent solution consisting of azobisisobutyronitrile, methyl ethyl ketone and methanol in a ratio of 2:6:3, following which the film was immediately dipped for 30 seconds in hot water of 80° C. The so obtained film had a surface which was uniformly

EXAMPLE 4

A 0.1-mm. thick polyacrylonitrile film was dipped for 10 minutes in a 50° C. foaming agent solution consisting of benzene sulfonylhydrazide, ethanol and dimethylformamide in a ratio of 2:6:2, following which this film was dipped for 3 minutes in 100° C. hot water containing as a decomposition assistant 1% by weight of stearic acid. The polyacrylonitrile film became completely white and opaque and writing and printing thereon were made possible.

EXAMPLE 5

A 20° C. foaming agent solution consisting of paratoluene sulfonylhydrazide, methyl ethyl ketone and methanol in a ratio of 3:5:2 was coated to a 5-mm. thick plate of polymethyl methacrylate and one minute later was placed in a constant temperature air tank of 80° C. where it was allowed to stand for 30 seconds. The so obtained polymethyl methacrylate plate had a surface which was uniformly roughened.

EXAMPLE 6

A polycarbonate vessel was dipped for 3 minutes in a 40° C. foaming agent solution consisting of dinitrosopentamethylene tetramine, m-cresol and methanol in a ratio of 1:1:8, followed by placing the vessel in a 210° C. constant temperature air tank. The surface of the polycarbonate vessel immediately became roughened such that writing and adhesion thereon of ink were made possible.

EXAMPLE 7

A nylon sheet 2 mm. in thickness was dipped for one minute in a foaming agent solution consisting of dinitrosopentamethylene tetramine, methanol and formic acid in a ratio of 2:5:3, after which this sheet was placed in a 200° C. constant temperature air tank where it was allowed to stand for one minute. The surface of the nylon sheet was roughened uniformly and finely such that writing and printing thereon were made possible.

EXAMPLE 8

In a 20° C. foaming agent solution consisting of paratoluene sulfoazide and methanol in a ratio of 0.5:9.5 was dipped for 0.5 second a 0.1-mm. thick styrene-butadiene copolymer film followed by allowing the film to stand for 10 seconds in 50° C. hot air. The film was then immersed in boiling water containing a neutral detergent while in a state in which its perimeter was secured fast. The so obtained styrene-butadiene copolymer film had a surface which was uniformly roughened and writing or printing thereon was made possible.

EXAMPLE 9

A 0.08-mm. stretched film formed from 75 parts of polystyrene, 25 parts of a styrenebutadiene copolymer (60 wt. percent styrene) and 20 parts of calcium carbonate was dipped for 2 seconds in a foaming agent solution consisting of paratoluene sulfoazide and methanol in a ratio of 0.5:9.5, after which the film was immersed in boiling water containing a neutral detergent. The film which turned completely white and opaque had its surface roughened uniformly and finely such that writing or printing thereon was made possible. When this film was held to the light, it seemingly had a reticular pattern and was very similar to usual paper.

EXAMPLE 10

A stretched polystyrene film 0.1 mm. in thickness was dipped for one minute in a foaming agent solution consisting of benzene sulfoazide and methanol in a ratio of 1:15, following which this film was immersed for 30 seconds in boiling water containing an alkylbenzene surfactant, while the ends of the film were secured fast. The so obtained film was semitransparent and its surface was uniformly roughened.

EXAMPLE 11

The surface of a 5-mm. thick polyvinyl chloride sheet was coated with a foaming agent solution consisting of diethylazodicarboxylate and tetrahydrofuran in a ratio of 2:8. One minute later the sheet was placed in a 165° C. constant temperature air tank where it was allowed to stand for 30 seconds. Luster disappeared from the so obtained sheet and it had a uniformly roughened surface.

EXAMPLE 12

A stretched polyvinyl chloride film 0.08 mm. in thickness was dipped for one second in a 50° C. foaming agent solution consisting of azodicarbonamide and dimethylformamide in a ratio of 1:20. This was followed by immediately securing the ends of the film fast and spraying momentarily heated steam of 200° C. and 16 kg./cm.$^2$ pressure against the surface of the film. The film turned completely white and became such that it was possible to write thereon with a pencil or aqueous ink.

EXAMPLE 13

A 0.1-mm. thick stretched polycarbonate film was dipped for one minute in a foaming agent solution consisting of paratoluene sulfonylhydrazide, ethylene dichloride and methanol in a ratio of 1:2:7. The film was then allowed to stand in open air for some time to volatilize the methanol, after which the film was placed in a 200° C. constant temperature air tank and allowed to stand therein while in a state in which its ends were secured fast. The so obtained polycarbonate film excelled as a tracing paper.

EXAMPLE 14

A foaming agent solution was prepared by mixing paratoluene sulfoazide and methanol in a ratio of 1:15. In forming a film by heating and melting polystyrene and extruding it from a T-die having a 0.5-mm. mold slit, the film while being wound up at the rate of about 10 meters per minute in the machine direction had its surface sprayed with the above foaming agent solution at a point about 5 cm. from the tip of the slit. The film immediately turned white. The undercomposed foaming agent was washed and eliminated by passing the film through methanol, after which it was dried. The so obtained polystyrene film, which had been turned white in color, had a thickness of about 0.1 mm., and the minute pits were formed in the upper layer portion thereof to a thickness about 0.03 mm.

When the surface of the film was examined, it was seen that minute spherical pits were present uniformly distributed over the surface of the film. This film could be readily written on or be printed. Further, when the strength of this film was compared with that of polystyrene film of the same thickness, there was hardly any difference.

EXAMPLE 15

A foaming agent solution consisting of a mixture of paratoluene sulfoazide, toluene, methanol and clay in a ratio of 1:2:6:1 was prepared. In forming polypropylene into film, the foregoing foaming agent solution was roll-coated at 50° C. to the surface of the formed film at a point about 7 cm. from the tip of the slit. The so obtained film had a surface which was satisfactorily roughened.

EXAMPLE 16

A foaming agent solution was prepared by mixing paratoluene sulfoazide, methanol and xylene in a ratio of 2:3:3. In forming polyethylene into film by the inflation molding method by extruding the resin from a 1-mm. mold slit and winding up the formed film at the rate of about 10 meters per minute, the foregoing foaming agent solution was sprayed against the surface of the film at a point about 5 cm. from the slit tip. The film was imparted a satisfactory roughened surface.

EXAMPLE 17

A foaming agent solution was prepared by mixing azobisisobutyronitrile and acetone in a ratio of 2:8. In forming polyvinyl chloride into film by the inflation molding method by extruding the polyvinyl chloride from a 1-mm. slit and taking up the formed film at a rate of about 10 meters per minute, the foregoing foaming agent solution was sprayed against the surface of the film at a point 15 cm. from the slit tip. The film immediately turned semi-transparent and the film was imparted a satisfactory roughened surface.

EXAMPLE 18

A foaming agent solution was prepared by mixing paratoluene sulfoazide, methyl ethyl ketone and methanol in a ratio of 2:5:3. In extruding a 3-mm. thick plate of polymethyl methacrylate, the foregoing foaming agent solution was sprayed against the plate surface at a point about 5 cm. from the slit tip. The surface layer of the plate was formed into a white porous layer about 0.03 mm. thick. The plate became a product resembling ground glass.

EXAMPLE 19

A foaming agent solution was prepared by mixing paratoluene sulfonyl hydrazide, ethylene dichloride and methanol in a ratio of 2:4:4. In forming polycarbonate into a bottle by the blow molding method, after completion of the blowing, the foregoing foaming agent solution was sprayed against the inside of the bottle during cooling stage. After allowing the bottle to stand for a while to cool, it was removed from the mold. A white porous layer was formed on the inside of the so obtained bottle to make it easy to paint the inside of the bottles.

EXAMPLE 20

A foaming agent solution was prepared by mixing paratoluene sulfoazide and acetone in a ratio of 2:8, in which was further dissolved, based on the foregoing acetone, 5% by weight of low molecular weight polystyrene ("Picolastic" A–25, molecular weight about 325). In forming shock resistant poystyrene ("Styron" 475, a product of Asahi Dow Company, Japan) into a vessel by the injection molding method, the foregoing foaming agent solution was coated in advance the inside surface of the two molds maintained at below 70° C. After the acetone of the foaming agent solution had practically volatilized, the resin was formed by injection into the mold at a resin temperature of 190° C., followed by immediately cooling the product by opening the molds. The so obtained vessel had its two surfaces roughened like ground glass.

The low molecular weight polystyrene which was mixed into the foaming agent solution in this example was for assisting the adhesion of the foaming agent solution to the mold. It is so to say a viscosity thickening agent.

EXAMPLE 21

A foaming agent solution was prepared by mixing dinitrosopentamethylene tetramine, methanol and formic acid in a ratio of 2:5:3. Nylon 66 was melted and extruded as filaments, against which was sprayed the foregoing foaming agent solution of 50° C., at a point about 3 cm. from the slit tip. Filaments whose surface portion was whitened were obtained. The so obtained filaments were very readily dyed. Further, when these filaments were prcoessed and made into a nonwoven fabric, one which could be written on or printed was obtained.

EXAMPLE 22

A foaming agent solution was prepared by mixing paratoluene sulfoazide and methanol in a ratio of 1:20. A polystyrene foamed sheet was produced by the inflation molding method by extruding from a 1.5-mm. mold slit a resin composition comprising polystyrene containing a low boiling saturated aliphatic hydrocarbon ("Styrobeads," a product of Sekisui Kagaku Kogyo Kabushiki Kaisha, Japan), in which composition were also incorporated in suitable amounts an organic acid, sodium bicarbonate and fillers. While carrying out the foregoing process, the aforesaid foaming agent solution was sprayed against the surface of the polystyrene foamed sheet at a point about 2 cm. from the slit tip. The so obtained polystyrene foamed sheet was imparted a satisfactory roughened surface. The pits formed in the surface of this polystyrene foamed sheet were of star-shaped structure, and the surface of the sheet was capable of being written or printed on. And when this sheet was compared with a polystyrene foamed sheet which had not received the present treatment, its luster was inferior but there was practically no difference in its strength.

EXAMPLE 23

A foaming agent solution was prepared by mixing paratoluene sulfoazide and methanol in a ratio of 2:8. In forming polyvinyl chloride into film by extruding it from a T-die having a 0.5 mm. mold slit, the foregoing foaming agent solution was sprayed against both surfaces of the film at a point 5 cm. from the slit tip, following which the film was cooled and a tacky producer was coated on one side of the film. The coating of the tacky producer could be carried out very easily and uniformly. The other side of this film could be printed or written on.

EXAMPLE 24

A foaming agent solution was prepared by mixing azobisisobutyronitrile, methyl ethyl ketone and methanol in a ratio of 1:2:18. On the other hand, a 15-mm. thick foamed polystyrene resin sheet having independent cells and of density 0.031 g./cm.$^3$ was compressed for 10 seconds at a pressure of 350 kg./cm.$^2$ with pressing rolls having a surface temperature of about 80° C. The so obtained 0.12-mm. thick sheet was immersed for 3 seconds in the aforesaid foaming agent solution followed by immediately dipping the sheet in 80° C. hot water in which had been mixed in a nonion surfactant and stearic acid (a decomposition assistant of the foaming agent). After drying the resulting sheet had a surface in which were formed minute spherical pits such that writing and printing thereon was made very easy.

EXAMPLE 25

A foaming agent solution was prepared by mixing and suspending 10% by weight of paratoluene sulfoazide in water in which had been dissolved 20% by weight of a nonion surfactant and 1% by weight of polyvinyl alcohol (a viscosity increasing agent). On the other hand, a composition comprising 100 parts by weight of shock resistant polystyrene ("Styron" 475, a product of Asahi Dow company, Japan), 20 parts by weight of a low molecular weight polystyrene ("Picolastic" A–25, molecular weight 325), 20 parts by weight of talc and 10 parts by weight of zinc sulfide was formed into film by extruding by the inflation molding method from a 1-mm. mold slit, followed by winding up the film at a rate of about 10 meters per minute imparting a biaxial stretch thereto. This film had a thickness of 0.1 mm. and was white and opaque. The surface of the so obtained film was coated with the aforesaid foaming agent solution followed by dipping in a 120° C. 1:1 mixture of ethylene glycol and water. The film was imparted a good roughened surface on which it was possible to write as well as print.

EXAMPLE 26

A foaming agent solution was prepared by dissolving 1% by weight of dinitrosopentamethylene tetramine in a 60° C. benzene-methanol mixed liquid (benzene 1:methanol 1), and by further addition of 10% by weight of anone. On the other hand, a composition comprising 100 parts by weight of polyvinyl chloride "Nicavinyl" MF–80 (a product of Nihon Carbide Company, Japan), 20 parts by weight of D.O.P. and 3 parts by weight of "Adeka" 120 (Asahi Denka Company, Japan) and 1 part by weight of BC–1000T (Toa Rika Kogyo Company, Japan) as stabilizer, 0.5 part by weight of ultraviolet absorbent and 1 part by weight of BHT "Sevanox" (Yoshitani Pharmaceutical Company, Japan) was formed into film by extruding it from a 1-mm. mold slit by the inflation molding method and wound up at the rate of about 10 meters per minute. The so obtained film was immersed in the foregoing foaming agent solution for 10 seconds followed by dipping for 20 seconds in hot water of 100° C., in which was dissolved a small quantity of salicylic acid (a decomposition assistant of foaming agents), while securing the film ends fast. The so obtained film could be used as an excellent tracing paper substitute. On the other hand, when instead of the treatment in hot water in the hereinabove described method an experiment was carried out in which the film was allowed to stand in a 100° C. constant temperature air tank, the film so obtained was unsatisfactory since the roughened surface obtained was nonuniform.

EXAMPLE 27

A composition consisting of 100 parts by weight of polystyrene and 10 parts by weight of polybutadiene was formed into film 0.10 mm. thick by the inflation molding method, after which this film was doubled and dipped for one minute in a foaming agent solution consisting of azoibisisobutyronitrile, methyl ethyl ketone and methanol in a ratio of 0.5:4.5:5. This was followed by immersion of the film in 100° C. hot water in which were mixed a neutral detergent and ethylene glycol. One side of the so obtained film was imparted a satisfactory roughened surface.

EXAMPLE 28

A foaming agent solution was prepared by mixing paratoluene sulfoazide, tetrahydrofuran and methanol in a ratio of 2:3:5. The film used in Example 26 was further chlorinated with ultraviolet rays in the presence of chlorine. To the surface of this film was then applied the foregoing foaming agent solution at 20° C. and, after 30 seconds had passed, the film was allowed to stand for 30 seconds in a constant temperature air tank of 120° C. The so obtained film was used very satisfactorily as tracing paper.

We claim:

1. A method of uniformly roughening the surface of a solid shaped article of a thermoplastic synthetic resin selected from the group consisting of polyolefins, polyvinyl chloride, polyvinylidene chloride, polystyrene, polyacrylonitrile, polyacrylic acid esters, polymethacrylic acid esters, polyvinylacetals, polyamides, styrene-acrylonitrile copolymer, styrene-butadiene copolymer, vinylchloride-ethylene copolymer, ethylene-vinylacetate copolymer, styrene-methyl methacrylate copolymer and mixtures thereof which comprises impregnating the surface layer of said shaped article with a normally liquid or molten thermally decomposable gas liberating agent said thermally decomposable gas liberating agent being selected from dinitrosopentamethylene tetramine, azobisisobutyronitrile, paratoluene sulfoazide, diethylazodicarboxylates, benzene sulfoazide, N,N′ - dimethyl - N,N′-dinitrosotelephthalamide, paratoluene sulfonylhydrazide, diphenyl sulfone, P,P′-dihydroxybisazodicarbamic acid amide, trihydrazinetriamine, azoidicarbonamide, diazoaminobenzene, P,P′-oxybisbenzene sulfonylhydrazide and mixtures thereof so as to form a rubber-like swollen surface layer on said shaped article and decomposing said gas liberating agent to evolve a gas by heating said shaped article to a temperature above the decomposition temperature of said thermally decomposable gas liberating agent so that the evolved gas erupts and escapes from the surface of the shaped article, thereby imparting a uniformly roughened surface to said shaped article.

2. The method of claim 1 wherein the temperature of said shaped article is lower than the decomposition temperature of said thermally decomposable gas liberating agent when said shaped article is impregnated therewith, said shaped article impregnated with said thermally decomposable gas liberating agent being subsequently heated to decompose said thermally decomposable gas liberating agent.

3. The method of claim 1 wherein said shaped article is impregnated with said thermally decomposable gas liberating agent immediately after formation of said shaped article and while the temperature of said shaped article is higher than the decomposition temperature of said thermally decomposable gas liberating agent, said thermally decomposable gas liberating agent being decomposed by the heat of said shaped article.

4. The method according to claim 1 wherein said shaped article of a thermoplastic synthetic resin is a thermoplastic synthetic resin film.

5. The method of claim 4 wherein said thermoplastic synthetic resin film is a stretched film.

6. The method of claim 4 wherein said synthetic resin film is impregnated with said thermally decomposed gas liberating agent while being stretched.

7. The method according to claim 1 wherein said shaped article of thermoplastic synthetic resin is a foamed thermoplastic synthetic resin film.

8. The method of claim 6 wherein said foamed synthetic resin film is impregnated with said thermally decomposed gas liberating agent while being stretched.

9. The process according to claim 2 wherein said heating is effected by immersing said shaped article in a heated nonsolvent of the resin which forms the shaped article.

References Cited

UNITED STATES PATENTS

| | | | |
|---|---|---|---|
| 3,300,552 | 1/1967 | Shelby | 264—53 X |
| 3,341,481 | 9/1967 | Palmer | 264—54 X |
| 3,365,353 | 1/1968 | Witman | 264—54 X |
| 3,373,072 | 3/1968 | Jones | 264—54 X |
| 3,389,199 | 6/1968 | Bushnell et al. | 264—53 |
| 3,389,198 | 6/1968 | Taber | 264—54 X |
| 3,200,176 | 8/1965 | Baxter | 264—54 |
| 3,422,171 | 1/1969 | Oppenlander | 264—51 |

JULIUS FROME, Primary Examiner

P. A. LEIPOLD, Assistant Examiner

U.S. Cl. X.R.

264—48, 129, 210, 340